(12) United States Patent
Liu et al.

(10) Patent No.: US 8,928,684 B2
(45) Date of Patent: Jan. 6, 2015

(54) OVERDRIVE DEVICE

(71) Applicant: Novatek Microelectronics Corp., Hsinchu (TW)

(72) Inventors: Guang-Zhi Liu, Shanghai (CN); Jian-De Jiang, Xian (CN)

(73) Assignee: Novatek Microelectronics Corp., Hsinchu (TW)

( * ) Notice: Subject to any disclaimer, the term of this patent is extended or adjusted under 35 U.S.C. 154(b) by 190 days.

(21) Appl. No.: 13/782,378

(22) Filed: Mar. 1, 2013

(65) Prior Publication Data

US 2014/0009483 A1   Jan. 9, 2014

(30) Foreign Application Priority Data

Jul. 3, 2012  (CN) .......................... 2012 1 0229459

(51) Int. Cl.
*G09G 5/02* (2006.01)
*G06T 15/50* (2011.01)
*H04N 13/00* (2006.01)
*H04N 13/04* (2006.01)

(52) U.S. Cl.
CPC ............... *G06T 15/50* (2013.01); *H04N 13/00* (2013.01); *H04N 13/0025* (2013.01); *H04N 13/0438* (2013.01)
USPC ........... 345/589; 345/109; 345/419; 345/581; 345/601; 345/602

(58) Field of Classification Search
CPC ... G09G 5/02; G09G 5/06; G09G 2320/0666; G09G 2320/062; G06T 11/001
USPC ................. 345/109, 419, 581, 589, 601–602
See application file for complete search history.

(56) References Cited

U.S. PATENT DOCUMENTS

| | | | |
|---|---|---|---|
| 2007/0290964 A1* | 12/2007 | Yang ............................... | 345/87 |
| 2009/0129698 A1* | 5/2009 | Wang et al. .................... | 382/274 |
| 2010/0040280 A1 | 2/2010 | McKnight | |

\* cited by examiner

*Primary Examiner* — Xiao M. Wu
*Assistant Examiner* — Todd Buttram
(74) *Attorney, Agent, or Firm* — Rabin & Berdo, P.C.

(57) ABSTRACT

An overdrive device includes a training unit, an analysis unit and a Contrast adjustment unit. The training unit establishes a luminance difference look-up table (LUT) having an $R^2$ number of luminance differences. Each of the $R^2$ number of luminance differences represents a luminance difference between a measured display luminance value and a target luminance value of a display device when each of first and second viewing angle images correspond to any value of a grayscale range R. With respect to first and second viewing angle input image data, for pixel data therein corresponding to a same pixel position, the analysis unit looks up the luminance difference LUT to obtain a looked-up luminance difference, and accordingly calculates a luminance difference index. The contrast adjustment unit partially adjusts the grayscale of the second viewing angle image according to the luminance value index to obtain headroom for an overdrive operation.

7 Claims, 5 Drawing Sheets

| F1 | | | | | | | Table_L |
|---|---|---|---|---|---|---|---|
| GL(R-1) | LD(R-1,0) | LD(R-1,1) | LD(R-1,2) | • • • | LD(R-1,R-2) | LD(R-1,R-1) | |
| GL(R-2) | LD(R-2,0) | LD(R-2,1) | LD(R-2,2) | • • • | LD(R-2,R-2) | LD(R-2,R-1) | |
| • • • | • • • | • • • | • • • | • • • | • • • | • • • | |
| GL(2) | LD(2,0) | LD(2,1) | LD(2,2) | • • • | LD(2,R-2) | LD(2,R-1) | |
| GL(1) | LD(1,0) | LD(1,1) | LD(1,2) | • • • | LD(1,R-2) | LD(1,R-1) | |
| GL(0) | LD(0,0) | LD(0,1) | LD(0,2) | • • • | LD(0,R-2) | LD(0,R-1) | |
| | GL(0) | GL(1) | GL(2) | • • • | GL(R-2) | GL(R-1) | F2 |

_US 8,928,684 B2_

OVERDRIVE DEVICE

OVERDRIVE DEVICE

This application claims the benefit of People's Republic of China application Serial No. 201210229459.X, filed Jul. 3, 2012, the subject matter of which is incorporated herein by reference.

BACKGROUND

1. Field of the Invention

The invention relates in general to an overdrive device, and more particularly to an overdrive device for an active shutter three-dimensional (3D) system.

2. Description of the Related Art

In the modern world with ever-progressing technologies, three-dimensional (3D) display techniques have been developed for promoting audiovisual entertainment effects. An active shutter 3D system is one of the most prevalent 3D display techniques. For example, an active shutter 3D system includes shutter glasses and a display device. Within alternate left-eye and right-eye display periods of the display device, the display device outputs images respectively corresponding to a left-eye viewing angle and a right-eye viewing angle, and the shutter glasses correspondingly shield a right-eye sight and a left-eye sight of a viewer during the left-eye and right-eye display periods. Accordingly, the active shutter 3D system effectively provides images of different viewing angles to the left and right eyes of the viewer to achieve 3D display effects.

As stated above, in a current active shutter 3D system, a display device needs to alternately display images of different viewing angles. Thus, liquid crystal molecules in the display device may encounter insufficient response time to result in crosstalk. Therefore, there is a need for a driving mechanism as a solution for effectively overcoming issues of an insufficient response time and unsatisfactory quality.

SUMMARY

According to an aspect of the present invention, an overdrive device for an active shutter three-dimensional (3D) system is provided. The overdrive device drives a display device to respectively display first and second viewing angle images within first and second viewing angle display periods which are adjacent and sequentially triggered. Each of the first and second viewing angle images has a grayscale range R, where R is a natural number greater than 1. The overdrive device includes a training unit, an analysis unit, a contrast adjustment unit, and an overdrive unit. The training unit establishes a luminance difference look-up table (LUT) having an $R^2$ number of luminance differences. Each of the $R^2$ number of luminance differences represents a luminance difference between a measured display luminance value and a target luminance value of the display device when the first viewing angle image corresponds to a value in the grayscale range R and the second viewing angle image corresponds to a value in the grayscale range R. The analysis unit sequentially receives first and second viewing angle input image data, and looks up the luminance difference LUT to correspondingly obtain a looked-up luminance difference according to first pixel data and second pixel data corresponding to a same pixel position in the first viewing angle input image data and the second viewing angle input image data. The analysis unit further generates a luminance difference index for each pixel position according to the looked-up luminance difference. In response to the luminance difference index corresponding to each pixel position, the contrast adjustment unit performs a conversion to obtain a luminance difference adjustment gain, and accordingly adjusts the grayscale of the second pixel data to obtain corrected pixel data. The overdrive unit provides an overdrive voltage for driving the display device according to the corrected pixel data.

The above and other aspects of the invention will become better understood with regard to the following detailed description of the non-limiting embodiments. The following description is made with reference to the accompanying drawings.

DETAILED DESCRIPTION

In an overdrive device disclosed by the embodiments, contrast is partially reduced with respect to second viewing angle image data to obtain a headroom for overdrive.

Figures 1, 2:
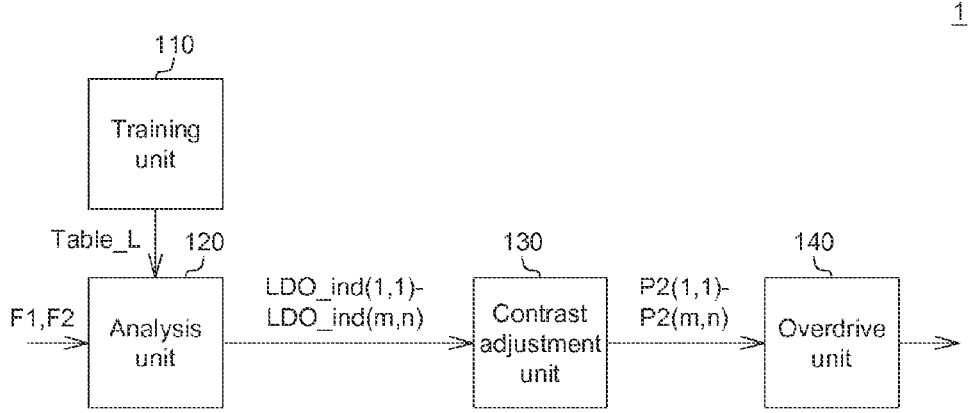
FIG. 1 is a block diagram of an overdrive device according to an embodiment.
FIG. 2 is a schematic diagram of a luminance difference look-up table (LUT) according to an embodiment.

FIG. 1 shows a block diagram of an overdrive device according to an embodiment. An overdrive device 1 according to the embodiment is applied to an active shutter three-dimensional (3D) system (not shown). The active shutter 3D system includes shutter glasses and a display device. Within first and second viewing angle display periods which are adjacent and sequentially triggered, the overdrive device 1 drives the display device to respectively display first and second viewing angle images. For example, the first viewing angle image and the second viewing angle image are respectively a left-eye viewing angle image and a right-eye viewing angle image. Further, each piece of pixel data in the first viewing angle image selectively ranges between R numbers of grayscale levels: GL(0), GL(1), . . . , and GL(R-1); and each piece of pixel data in the second viewing angle image selectively ranges between R number of grayscale levels between GL(0) and GL(R-1), where R is a natural number greater than 1.

Within the first and second viewing angle display periods, the shutter glasses respectively shield a right-eye sight and a left-eye sight of a viewer. Thus, the left and right eyes of the viewer are enabled to respectively perceive the first and second viewing angle images corresponding to different viewing angles to implement 3D display effects.

The overdrive device 1 includes a training unit 110. The training unit 110 obtains a measured display luminance value of the display device in a training phase to obtain an $R^2$ number of luminance differences LD(0, 0) to LD(R-1, R-1)

between an $R^2$ number of measured display luminance values LR(0, 0) to LR(R-1, R-1) and an $R^2$ number of corresponding target luminance values LT(0, 0) to LT(R-1, R-1) when the first viewing angle image corresponds to an arbitrary value from GL(0) to GL(R-1) and the second viewing angle image corresponds to an arbitrary value from GL(0) to GL(R-1) of the grayscale range R. The training unit 110 accordingly establishes a luminance look-up table (LUT) Table_L, as shown in FIG. 2. For example, using the luminance difference LUT Table_L, the first viewing angle image corresponding to an arbitrary value from GL(0) to GL(R-1) and the second viewing angle image corresponding to an arbitrary value from GL(0) to GL(R-1) of the grayscale range R are mapped to a corresponding luminance difference from LD(0, 0) to LD(R-1, R-1).

The overdrive device 1 further includes an analysis unit 120, a contrast adjustment unit 130 and an overdrive unit 150. With reference to the luminance different LUT Table_L in a driving phase, the overdrive device 1 analyzes, adjusts grayscale levels of the pixel data in the first and second viewing angle images, and maps the adjusted grayscale levels to a corresponding overdrive voltage, so as to perform an overdrive operation on the display device. Operations of the overdrive device 1 in the training phase and the driving phase are described in detail with the examples below.

Training Phase

In the training phase, the training unit 110 drives the display device and measures a luminance value of the display device to generate a luminance difference LUT Table_L.

Figure 3:
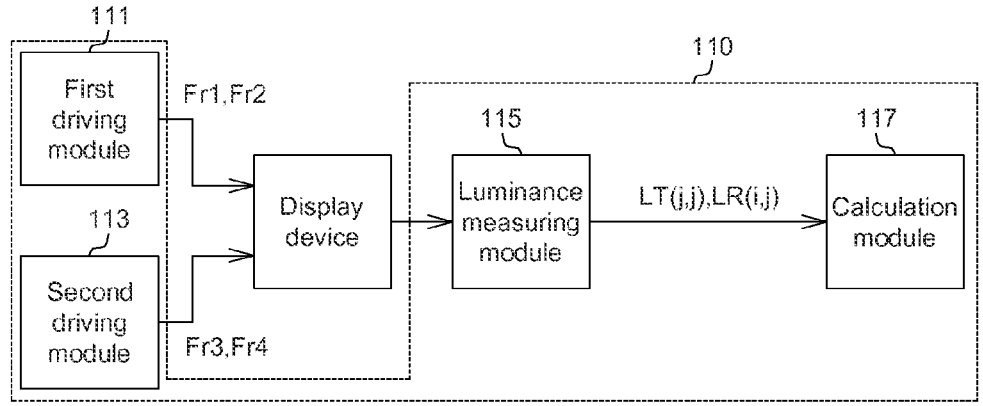
FIG. 3 is a detailed block diagram of a training unit 130 of an embodiment.

FIG. 3 shows a detailed block diagram of the training unit 110 according to the embodiment. The training unit 110 includes a first driving module 111, a second driving module 113, a luminance measuring module 115, and a calculation module 117.

Figure 4A:
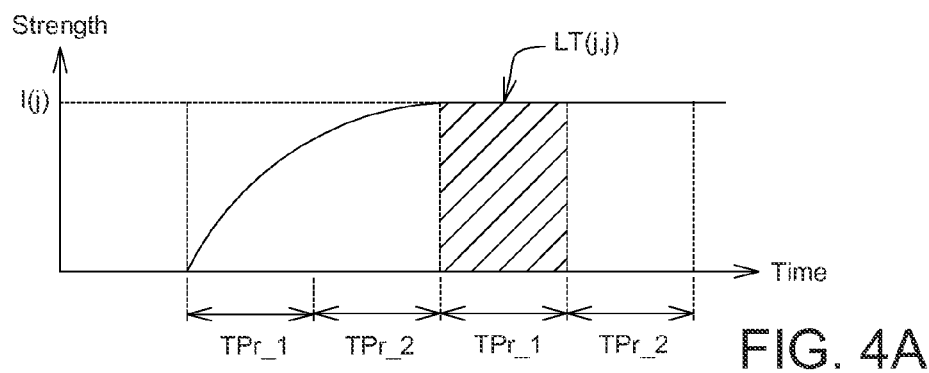
FIGS. 4A and 4B are schematic diagrams of timings of a luminance change of a display device.

In a first viewing angle measuring period TPr_1 and a second viewing angle measuring period TPr_2, the first driving module 111 respectively provides first test viewing angle image data Fr1 and second test viewing angle image data Fr2 both corresponding to a same grayscale level GL(j) to drive the display device, as shown in FIG. 4A. For example, the first and second test viewing angle image data Fr1 and Fr2 both correspond to a grayscale level GL(j). In the first and second viewing angle measuring periods TPr_1 and TPr_2, the display device correspondingly displays a target luminance value LT(j, j), where j is a natural number smaller than or equal to R. For example, the target luminance value LT(j, j) is a value obtained by integration from an illumination intensity I(j) in the first viewing angle measuring period TPr_1, as represented by a shaded block of slanted lines in FIG. 4A.

Figure 4B:
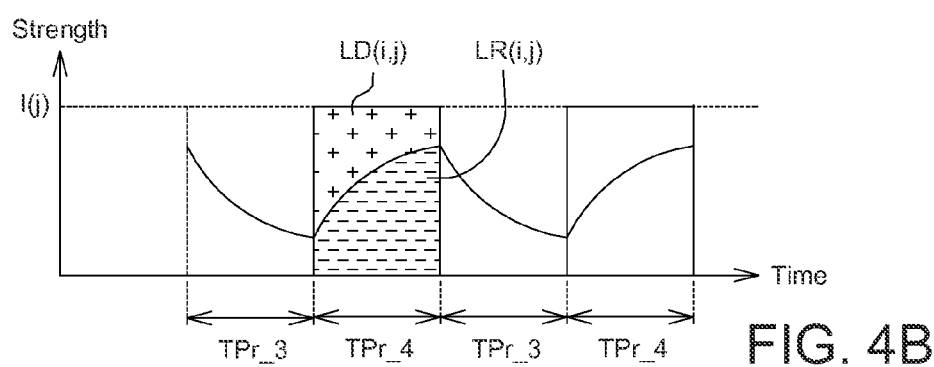

In a third viewing angle measuring period TPr_3 and a fourth viewing angle measuring period TPr_4, the second driving module 113 respectively provides third test viewing angle image data Fr3 and fourth test viewing angle image data Fr4 corresponding to different grayscale levels to drive the display device, as shown in FIG. 4B. For example, the third and fourth test viewing angle image data Fr3 and Fr4 respectively correspond to grayscale levels and GL(i) and GL(j). In the fourth viewing angle measuring period TPr_4, the display device correspondingly displays a measured display luminance value LR(i, j), where i is a natural number smaller than j and smaller than or equal to R. For example, the measured display luminance value LR(i, j) is a value obtained by integration from an illumination intensity in the fourth viewing angle measuring period TPr_4. In FIG. 4B, the measured display luminance value LR(i, j) is represented by a block having minus signs, and the luminance difference LD(i, j) is represented by a block having plus signs.

The luminance measuring module 117 measures the display luminance value of the display device in the first viewing angle measuring period TPr_1 to obtain the target luminance value LT(j, j). Similarly, the luminance measuring module 117 further measures the display luminance value of the display device in the fourth viewing angle measuring period TPr_4 to obtain the measured display luminance value LR(i, j).

The calculation module 119 receives the target luminance value LT(j, j) and the measured display luminance value LR(i, j), and subtracts the target luminance value LT(j, j) from the measured display luminance value LR(i, j) to obtain the luminance difference LD(i, j).

Figure 5A:
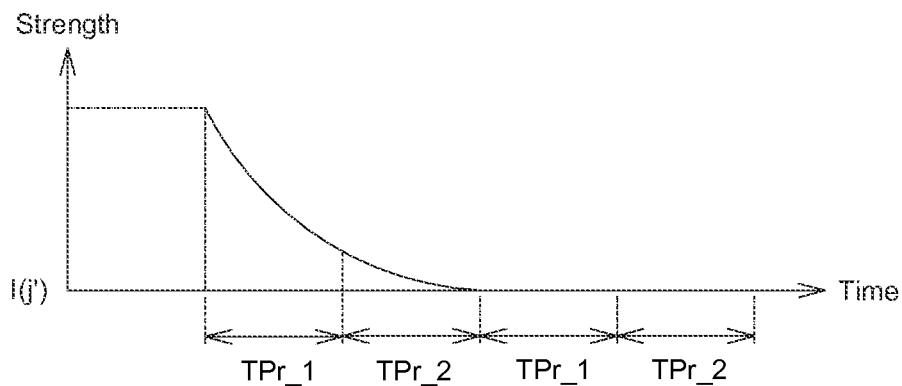
FIGS. 5A and 5B are schematic diagrams of timings of another luminance change of a display device.
Figure 5B:
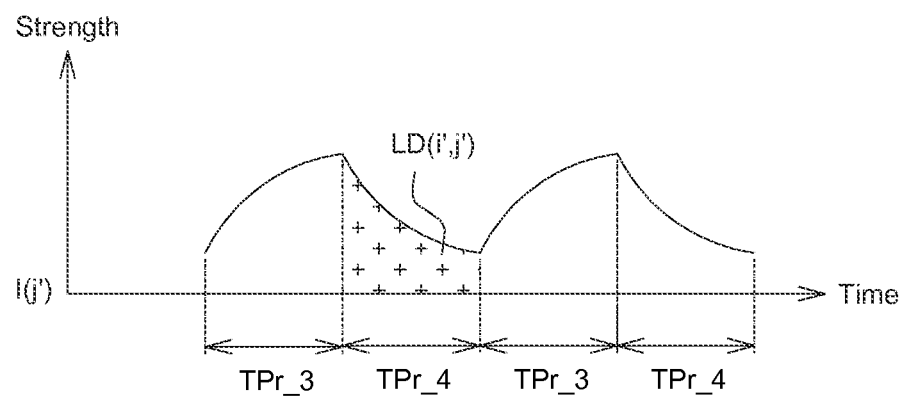

FIGS. 5A and 5B are schematic diagrams of timings of another luminance change of the display device according to the embodiment. In another operation example, a parameter j' is substantially smaller than a parameter i', and the timing diagrams of the luminance change of the display device are as shown in FIGS. 5A and 5B. Accordingly, the training unit 110 of the embodiment effectively obtains a luminance difference LD(i', j') via the foregoing operations of the training unit 110.

By adjusting the parameters i and j as well as driving the foregoing modules to repeatedly perform the corresponding operations, the training unit 110 of the embodiment effectively obtains all the $R^2$ number of corresponding luminance differences LD(0, 0) to LD(R-1, R-1) to establish the luminance difference LUT Table_L.

In the embodiment, the training unit 110 establishing one luminance difference LUT Table_L is exemplified for illustration purposes, but the embodiment of the training unit 100 is not limited. In other embodiments, the training unit 110 may also store luminance differences substantially greater than 0 (i.e., embodiments in which the measured display luminance value LR(i, j) is greater than the target luminance value LT(j, j)) to a luminance redundancy sub-LUT Table_+ according to polarities of the luminance differences LD(0, 0) to LD(R-1, R-1), and store luminance differences substantially smaller than 0 (i.e., embodiments in which the measured display luminance value LR(i, j) is smaller than the target luminance value LT(j, j)) to a luminance deficiency sub-LUT Table_-.

Driving Phase

In the driving phase, the overdrive device 1 performs an overdrive operation on the display device with reference to the luminance difference LUT Table_L.

Again referring to FIG. 1, the analysis unit 120 sequentially receives the first and second viewing angle input image data F1 and F2, and determines therefrom first pixel data P1(x, y) and second pixel data P2(x, y) corresponding to a same pixel position (x, y). For example, the horizontal resolution and the vertical resolution of the first and second viewing angle input image data F1 and F2 are respectively natural numbers m and n greater than or equal to 1, and x and y are respectively natural numbers smaller than equal to m and smaller than or equal to n. For example, the first and second pixel data P1(x, y) and P2(x, y) respectively correspond to grayscale levels GL(a) and GL(b), where a and b are non-negative integers smaller than or equal to R.

The analysis unit 120 looks up the luminance difference LUT Table_L according to the grayscale levels GL(a) and GL(b) to correspondingly obtain a luminance difference LDO_(x, y). The analysis unit 120 further generates luminance difference indices LDO_ind(1, 1) to LDO_ind(m, n) for the pixel positions (1, 1) to (m, n) according to numeral relationships between the luminance difference LDO_(x, y) and a threshold LD_th.

Figures 6, 7:
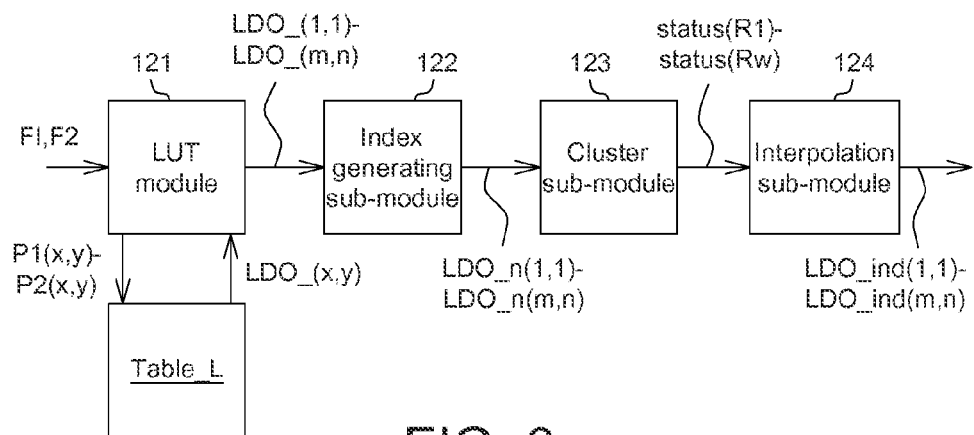
FIG. 6 is a detailed block diagram of an analysis unit 120.
FIG. 7 is a schematic diagram of statistical regions R1 to R2 and sub-regions SR1 to SRz therein.

FIG. 6 shows a detailed block diagram of the analysis unit 120. For example, the analysis unit 120 includes an LUT module 121, an index generating sub-module 122, a cluster sub-module 123, and an interpolation sub-module 124. The LUT module 121 looks up the luminance difference LUT Table_L according to the first and second pixel data P1(x, y) and P2(x, y) to obtain the luminance difference LDO_(x, y) corresponding to the display position (x, y). The LUT module 121 further adjusts the parameters x and y to obtain an m*n number of looked-up luminance differences LDO_(1, 1) to LDO_(m, n) corresponding to all the pixel positions (1, 1) to (m, n).

The index generating sub-module 122 numerically compares the looked-up luminance differences LDO_(1, 1) to LDO_(m, n) obtained from the LUT Table_1 with the threshold LD_th to generate an m*n number of numerical indices LDO_n(1, 1) to LDO_n(m, n). For example, when the luminance difference LDO_(x, y) is substantially greater than to equal to the threshold LD_th, the numerical index LDO_n(x, y) corresponds to a value 1. For example, a luminance difference LDO_(x, y) greater than the threshold LD_th mostly occurs when the difference between the grayscale levels GL(a) and GL(b) is at a greater value, e.g., when the grayscale levels GL(a) and GL(b) respectively approximate the maximum grayscale level GL(R-1) and the minimum grayscale level GL(0).

Conversely, when the luminance difference LDO_(x, y) is substantially smaller than the threshold LD_th, the numerical index LDO_n(x, y) corresponds to a value 0. For example, a luminance difference LDO_(x, y) smaller than the threshold LD_th mostly occurs when the grayscale levels GL(a) and GL(b) are approximate values, e.g., when the grayscale levels GL(a) and GL(b) both approximate the maximum grayscale level GL(R-1) or both approximate the minimum grayscale level GL(0).

Thus, with operations of the index generating sub-module 122, the analysis module 110 effectively selects the pixel data having luminance differences greater than the threshold DL_th, and correspondingly assigns a weighting value 1 to the selected pixel data.

The cluster sub-module 123 divides the numerical indices LDO_n(1, 1) to LDO_n(m, n) into multiple statistical regions R1, R2, . . . , and Rw according to the corresponding pixel positions, and each of the statistical regions R1 to R2 includes multiple statistical sub-regions SR1, SR2, . . . , and SRz, where w and z are natural numbers greater than 1. For example, w and z are respectively 256 and 9, and a schematic diagram of the statistical regions R1 to R256 and the statistical sub-regions SR1 to SR9 are as shown in FIG. 7.

For each of the statistical sub-regions SR1 to SRz, the cluster sub-module 123 calculates a sum of multiple numerical indices corresponding to the pixel positions to generate accumulated numerical indices Status(SR1) to Status(SRz). For example, the foregoing summation is represented by equation (1) below:

$$\text{Status}(SRi) = \sum_{(x,y) \in SRi} \text{LDO\_n}[P1(x, y), P2(x, y)] \quad (1)$$

By repeating the above operations, accumulated numerical indices Status(SR1) to Status(SRz) corresponding to the statistical sub-regions Sr1 to SRz in each of the statistical regions R1 to Rw are calculated and generated.

For each of the statistical regions R1 to Rw, the cluster sub-module 123 further determines a maximum accumulated numerical index in the z number of accumulated numerical indices Status(SR1) to Status(SRz) corresponding to each of the z number of statistical sub-regions SR1 to SRz, and utilizes the maximum accumulated numerical indices as statistical numerical values Status(R1) to Status(Rw). For example, the foregoing operation for determining the statistical numerical indices Status(R1) to Status(Rw) can be represented by equation (2) below:

$$\text{Status}(Ri) = \max_{SRj \in Ri}(\text{Status}(SRj)) \quad (2)$$

Accordingly, the cluster sub-module 123 generates a w number of statistical numerical indices Status(R1) to Status (Rw) for the statistical regions R1 to Rw, respectively.

The interpolation sub-module 124 generates by interpolation the luminance difference indices LDO_ind(1, 1) to LDO_ind(m, n) according to the statistical numerical indices Status(R1) to Status(Rw) of the statistical regions R1 to Rw with respect to the pixel positions. For example, the interpolation sub-module 124 performs a bilinear interpolation process to generate the luminance difference indices IDO_ind(1, 1) to LDO_ind(m, n) of the pixel positions (1, 1) to (m, n) according to the statistical numerical indices Status(R1) to Status(Rw) of the statistical regions R1 to Rw.

In response to the luminance difference indices LDO_in(1, 1) to LDO_ind(m, n) corresponding to the pixel positions (1, 1) to (m, n), the contrast adjustment unit 130 performs a conversion process to obtain luminance difference adjustment gains Gain(1, 1) to Gain(m, n), and accordingly adjusts the grayscale levels of the second pixel data P2(1, 1) to P2(m, n) to obtain corrected pixel data P2'(1, 1) to P2'(m, n).

The overdrive unit 140 provides an overdrive voltage for driving the display device according to the corrected pixel data P2'(1, 1) to P2'(m, n).

Figure 8:
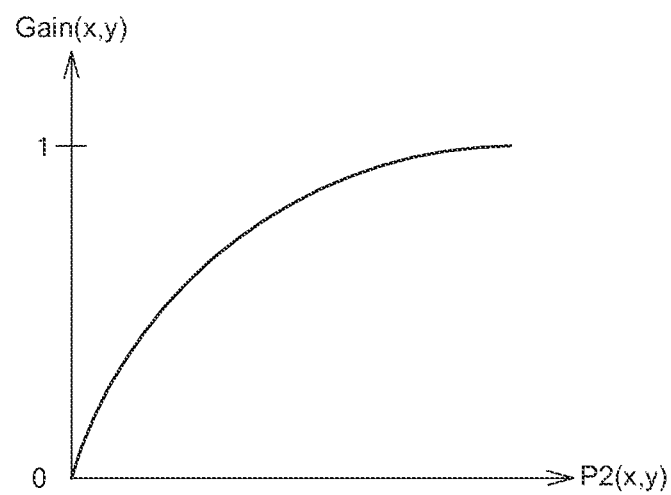
FIG. 8 is a schematic diagram of a relationship between a luminance difference adjustment gain Gain(x, y) and a luminance difference index LDO_ind(x, y).
Figure 9:
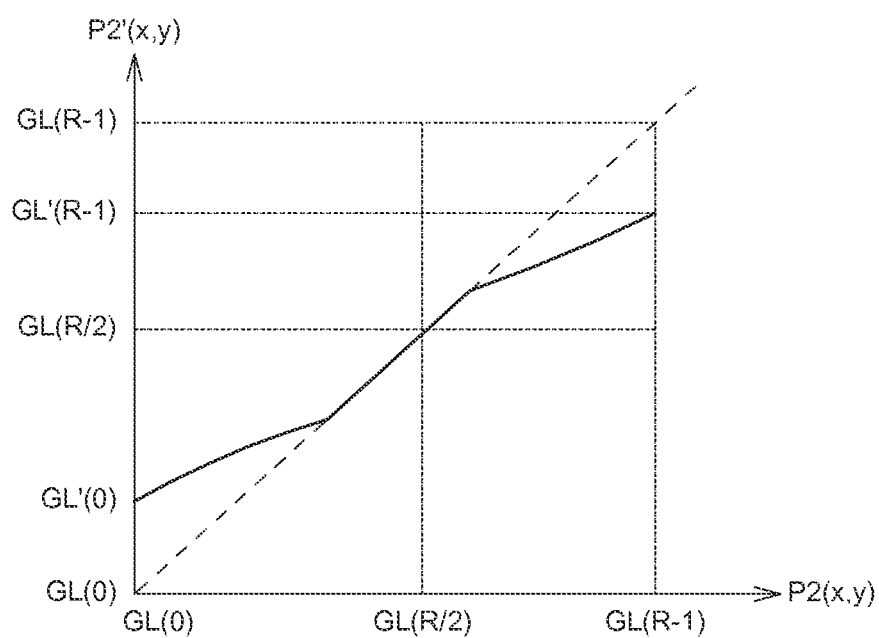
FIG. 9 is a schematic diagram of a relationship between corrected pixel data P2'(x, y) and second pixel data P2(x, y).

For example, the luminance difference adjustment gain Gain(x, y) and the luminance difference index LDO_ind(x, y) have a linear relationship as shown in FIG. 9, and the corrected pixel data P2'(x, y) and the second pixel data P2(x, y) have a linear relationship as shown in FIG. 9. Referring to FIGS. 8, and 9, with respect to the second pixel data P2(x, y) substantially most approximate to the maximum grayscale level GL(R-1), the value of the corresponding corrected pixel data P2'(x, y) is correspondingly reduced; with respect to the second pixel data P2(x, y) substantially most approximate to the minimum grayscale level GL(0), the value of the corresponding corrected pixel data P2'(x, y) is correspondingly increased. In contrast, in the second pixel data P2(1, 1) to P2(m, n), for the pixel data approximating a middle level GL(R/2), the contrast adjustment unit 130 maintains the linear relationship with the corresponding corrected pixel data P2'(x, y).

In other words, after the operations of the contrast adjustment unit 130, the grayscale range of the corrected pixel data P2'(x, y) is adjusted from the original GL(0) to GL(R-1) to a reduced grayscale range GL'(0) to GL'(R-1). Thus, with respect to the second pixel data P2(1, 1) to P2(m, n), the contrast adjustment unit 130 according to the embodiment effectively and partially adjusts the contrast of pixel data having a grayscale level approximating the maximum value or the minimum value, so as to obtain headroom between the grayscale range GL(0) to GL'(0) and the grayscale range GL(R-1) to GL'(R-1) for an overdrive operation. That is to say, compared to a conventional overdrive device, without globally adjusting the contrast for pixel data P2(x,y), the overdrive device of the embodiment additionally provides the headroom for an overdrive operation.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An overdrive device, applied to an active shutter three-dimensional (3D) system, for respectively display a first viewing angle image and a second viewing angle image in first and second viewing angle display periods which are adjacent and sequentially triggered, the first and second viewing angle images having a grayscale range R, R being a natural number greater than 1, the overdrive device comprising:
  a training unit, for establishing a luminance difference look-up table (LUT) having an $R^2$ number of luminance differences, each of the $R^2$ number of luminance differences representing a luminance difference between a measured display luminance value and a target luminance value of the display device when the first viewing angle image corresponds to a value in the grayscale range R and the second viewing angle image corresponds to a value in the grayscale range R;
  an analysis unit, for sequentially receiving first viewing angle input image data and second viewing angle input image data, looking up the luminance difference LUT according to first pixel data and second pixel data corresponding to a same pixel position in the first viewing angle input image data and the second viewing angle input image data to correspondingly obtain a looked-up luminance difference, and generating a luminance difference index for each pixel position according to the looked-up luminance difference;
  a contrast adjustment unit, for performing a conversion in response to the luminance difference index corresponding to each pixel position to obtain a luminance difference adjustment gain, and accordingly adjusting a grayscale of the second pixel data to obtain corrected pixel data; and
  an overdrive unit, for providing an overdrive voltage for driving the display device according to the corrected pixel data.

2. The overdrive device according to claim 1, wherein the training unit comprises:
  a first driving module, for respectively providing first test viewing angle image data and second test viewing angle image data corresponding to a same grayscale level in a first viewing angle measuring period and a second viewing angle measuring period to drive the display device;
  a second driving module, for respectively providing third test viewing angle image data and fourth test viewing angle image data in a third viewing angle measuring period and a fourth viewing angle measuring period to drive the display device;
  a luminance measuring module, for measuring a target luminance value of the display device in the second viewing angle measuring period, and obtaining a measured display luminance value of the display device in the fourth viewing angle measuring period; and
  a calculation module, for calculating a difference between the measured display luminance value and the target luminance value to obtain the luminance difference, and accordingly establishing the luminance difference LUT.

3. The overdrive device according to claim 2, wherein the luminance difference LUT comprises a luminance redundancy sub-LUT and a luminance deficiency sub-LUT; and the calculation module stores the luminance difference to the luminance deficiency sub-LUT when the measured display luminance value is substantially smaller than the target luminance value; and the calculation module stores the luminance difference to the luminance redundancy sub-LUT when the measured display luminance value is substantially greater than the target luminance value.

4. The overdrive device according to claim 1, wherein the analysis unit comprises:
  an LUT module, for looking up the luminance difference LUT according to the first pixel data and the second pixel data to obtain the looked-up luminance difference corresponding to a display position;
  an index generating sub-module, for numerically comparing each of the looked-up luminance differences obtained from the LUT with a threshold to correspondingly generate a numerical index;
  a cluster sub-module, for dividing the numerical indices into a plurality of statistical sub-regions according to the corresponding pixel positions, and obtaining an accumulated numerical index by summing the numerical indices in each of the statistical sub-regions; and for further dividing the statistical sub-regions into a plurality of statistical regions according to display positions of the statistical sub-regions, and obtaining a statistical numerical index from the accumulated numerical indices corresponding to the statistical sub-regions in each of the statistical regions; and
  an interpolation sub-module, for generating by interpolation the luminance difference index according to the statistical numerical indices of the statistical regions for each of the pixel positions.

5. The overdrive device according to claim 4, wherein the analysis module assigns a first value to the corresponding numerical index when the looked-up luminance differences are substantially greater than the threshold; and the analysis module assigns a second value to the corresponding numerical index when the looked-up luminance differences are substantially smaller than the threshold.

6. The overdrive device according to claim 1, wherein the luminance difference index and the luminance difference adjustment gain, corresponding to each of the pixel positions, are associated linearly.

7. The overdrive device according to claim 1, wherein the corrected pixel data is a linear function of the luminance difference adjustment gain.

* * * * *